(12) United States Patent
Qama et al.

(10) Patent No.: US 11,248,935 B2
(45) Date of Patent: Feb. 15, 2022

(54) POSITION SENSOR WITH VARYING OUTPUT SLOPE

(71) Applicant: Renesas Electronics America Inc., Milpitas, CA (US)

(72) Inventors: Gentjan Qama, Munich (DE); Jürgen Kernhof, Bissingen (DE)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/890,340

(22) Filed: Jun. 2, 2020

(65) Prior Publication Data

US 2021/0372822 A1 Dec. 2, 2021

(51) Int. Cl.
*G01D 5/20* (2006.01)

(52) U.S. Cl.
CPC .................................. *G01D 5/2073* (2013.01)

(58) Field of Classification Search
CPC ............................ G01D 5/2073; G01D 5/2086
See application file for complete search history.

(56) References Cited

U.S. PATENT DOCUMENTS

| 7,451,658 B2 * | 11/2008 | Sills ..................... G06F 3/03547 73/779 |
| 7,868,609 B2 * | 1/2011 | Zhitomirskiy .......... G01D 5/204 324/207.17 |
| 9,494,408 B2 * | 11/2016 | Singh .................... G01D 5/2046 |
| 10,323,959 B2 * | 6/2019 | Howard .................. B62D 1/185 |
| 2009/0091313 A1 * | 4/2009 | Teeters ................... G01B 7/003 324/207.16 |

\* cited by examiner

*Primary Examiner* — Walter L Lindsay, Jr.
*Assistant Examiner* — Milton Gonzalez
(74) *Attorney, Agent, or Firm* — Haynes and Boone, LLP

(57) ABSTRACT

A position sensor is presented. Some embodiments of a position sensor according to some embodiments includes a position sensor that includes a transmission coil; receive coils, the receive coils including at least one polarity change; a target configured to transit across the receive coils; and a controller configured to drive the transmission coil, receive signals from the receive coils, and provide a position response indicative of the target position over the receive coils, wherein the position response exhibits a first linear region of a first slope and a second linear region of a second slope.

20 Claims, 14 Drawing Sheets

POSITION SENSOR WITH VARYING OUTPUT SLOPE

TECHNICAL FIELD

Embodiments of the present invention are related to position sensors and, in particular, to a position sensor having varying output slope.

DISCUSSION OF RELATED ART

Position sensors are used in various settings for measuring the position of one component with respect to another. Inductive position sensors can be used in automotive, industrial and consumer applications for absolute rotary and linear motion sensing. In many inductive positioning sensing systems, a transmit coil is used to induce eddy currents in a metallic target that is sliding or rotating above a set of receiver coils. Receiver coils receive the magnetic field generated from eddy currents and the transmit coils and provide signals to a processor. The processor uses the signals from the receiver coils to determine the position of the metallic target above the set of coils. The processor, transmitter, and receiver coils may all be formed on a printed circuit board (PCB).

One of the challenges of designing position sensors is meeting user requirements. Typically, a position sensor is being designed to replace existing technology and consequently the housing and output signals of the new position sensor should match the housing and output signals of the existing technology. Typical position sensors provide a linear output signal as a function of target position.

Therefore, there is a need to develop position sensors with modified output signals.

SUMMARY

A position sensor is presented. Some embodiments of a position sensor according to some embodiments includes a position sensor that includes a transmission coil; receive coils, the receive coils including at least one polarity change; a target configured to transit across the receive coils; and a controller configured to drive the transmission coil, receive signals from the receive coils, and provide a position response indicative of the target position over the receive coils, wherein the position response exhibits a first linear region of a first slope and a second linear region of a second slope.

In some embodiments, a position includes receive coils that include a first coil and a second coil formed on a printed circuit board (PCB) in a geometry, wherein at least one of the first coil and the second coil is configured to include at least one phase change; and transmit coils formed on the PCB around the receive coils, wherein a position response as a target transits the receive coils includes a plurality of linear regions of differing slopes.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. w This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Embodiments of the present provide for position sensors with varied output signals. In particular, position sensors according to some embodiments include one or more phase changes in order that the slope of a position output signal according to target position can be modified.

Figure 1A:
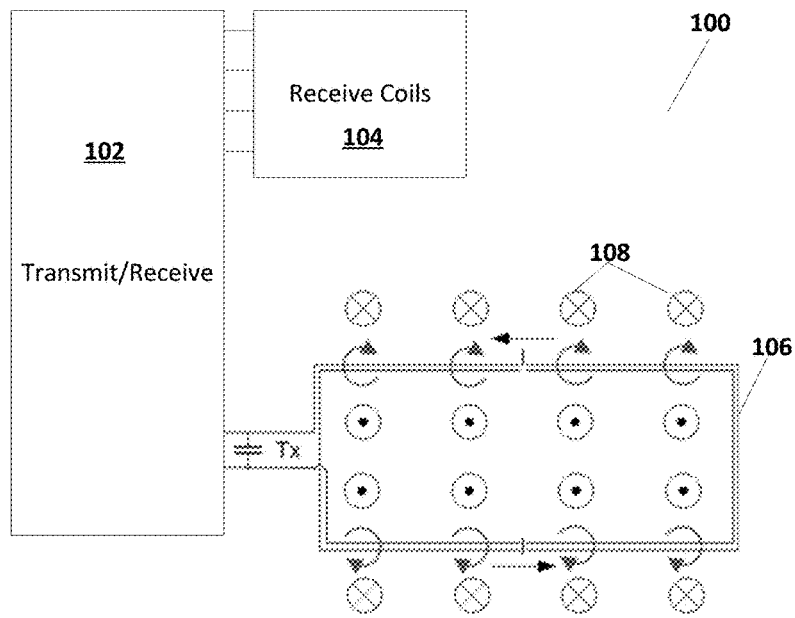
FIGS. 1A and 1B illustrate typical operation of a position sensor.
Figure 1B:
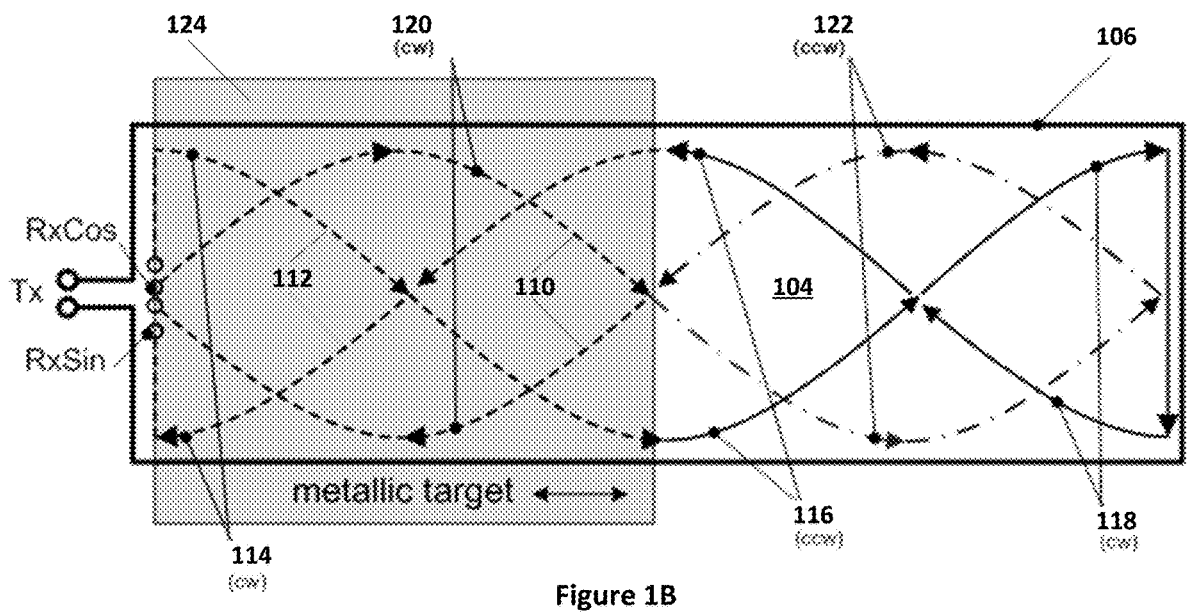

FIGS. 1A and 1B illustrate operation of a typical positioning system 100. Although FIGS. 1A and 1B illustrate operation of a linear position sensor, rotational position sensors are operationally the same. As illustrated in FIG. 1A, the positioning system includes transmit/receive control circuit 102 that is coupled to drive a transmitter coil 106 and receive signals from receive coils 104. In most configurations, receive coils 104 are located within transmitter coil 106, however in FIG. 1A they are illustrated separately for clarification purposes. Receive coils 104 are generally physically located within the border of transmit coil 106. Embodiments of the present invention can include a transmitter coil 106, two receiver coils 104, and an integrated circuit (IC) 102 driving the transmitter coil 106 and measuring the signals originated in the receiver coils 104 all formed on a printed circuit board (PCB).

FIG. 1B illustrates a configuration of transmit coils 106 and receive coils 104 in a linear position locating system. As is shown in FIG. 1B, a conductive metallic target 124 can be positioned over the transmitter coil 106 and the two receiver coils 104.

As is illustrated in FIG. 1A, transmit coil 106 is driven to form magnetic field 108. Transmit coil 106 can be driven at a range of frequencies or at particular frequencies. In FIG. 1A, magnetic field 108, with the positive current illustrated by the arrows, is circular around each wire and in a direction that points out of the page inside coil 106 and into the page outside of coil 106 with the current direction as illustrated in FIG. 1A. Receive coils 104 are located inside coil 106, as is illustrated in FIG. 1B. Transmit coil 106 is driven at any frequency that can produce electromagnetic field 108 to induce voltages in receiver coils 104. In general, there can be any number of receiver coils, however, for ease of discussion, a system with two receiver coils is illustrated in these examples.

FIG. 1B illustrates the arrangement of sensor receive coils (RX) 104 within transmit coil (TX) 106 for a linear position sensor. As illustrated in FIG. 1B, sensor receive coils 104 includes a sine-wave signal coil RXSIN 112 and a cosine-wave signal coil RXCOS 110. Sine-wave signal coil RXSIN 112 includes sine loops 114, 116, and 118 where coil 112 is wound in in-phase or anti-phase directions, here depicted as clockwise or counter clockwise depictions, to result in the production of voltages in the loop of opposite sign as a result of the presence of electro-magnetic field 108. As is illustrated, the wiring of sine-wave signal coil 112 provides a clockwise rotation in loops 114 and 118 resulting in a nominally positive polarity and a counterclockwise rotation in loop 116 resulting in nominally negative polarity. Similarly, cosine-wave signal coil 110 may include a first loop 120 with a clockwise orientation and a second loop 122 with a counterclockwise orientation. FIG. 1B illustrates a possible electromotive force reference direction, as indicated by the arrows, that is consistent with the magnetic fields produced by transmitter coil 106 as illustrated in FIG. 1A.

In the system illustrated in FIG. 1B, the transmitter coil (TX) 106 is stimulated by the circuit 102, which may be an integrated circuit, to generate a variable Electromagnetic field (EMF), illustrated as magnetic field 108. The magnetic field 108 couples with the receiver coils (RX) 104. If a conductive metallic target 124 is placed on the top of the receiver coils 104 as illustrated in FIG. 1B, an eddy current is generated in the metallic target 124. This eddy current generates a new electromagnetic field that is ideally equal and opposite of field 108, canceling the field in receiver coils 104 directly under metallic target 124. The receiver coils (RX) 104 capture the variable EMF field 108 generated by the transmit coils 106 and those induced by metallic target 124, resulting in sinusoidal voltages generated at the terminals of receiver coils 104.

In absence of metallic target 124, there will be no voltage at the terminals of the RX coils 104 (labeled RxCOS 110 and RXSin 112 in FIG. 1B). When metallic target 124 is placed in a specific position with respect to the RX coils 104, the resultant electromagnetic field on the area covered by the metallic target 124 is ideally zero and therefore the voltages at the terminals of the RX coils 104 will have different characteristic depending on the location of metallic target 124 relative to receiver coils 104. The RX coils 104 are designed in a way that a sine voltage (Vsin) is created at the terminals of one RX coil (RxSin 112) and a cosine voltage (Vcos) is created at the terminals of the other RX coil (RxCos 110) as metallic target 124 is swept across receiver coils 104. The position of the target with respect to the RX coils 104 modulates the amplitude and the phase of the voltage at the terminals of the RX coils 104. The output response can be calculated as proportional to arctangent (Vsin/Vcos).

As illustrated in FIG. 1A and discussed above, transmitter coil 106, receive coils 104, and transmit/receive circuit 102 can be mounted on a single PCB. Further, the PCB can be configured such that metallic target 124 is positioned above receive coils 104 and spaced from receive coils 104 by an air gap (AG). The position of metallic target 124 relative to the PCB on which receive coils 104 and transmitter coil 106 is mounted can be determined by processing the signals generated by sine-oriented coil 112 and cosine-oriented coil 110. Below, the determination of the position of metallic target 124 with respect to receive coils 104 is described in a theoretical ideal condition.

In FIG. 1B, metallic target 124 is located at a first location. In this example, FIG. 1B and depicts operation of a linear position locator system. The principle of operation is the same in both linear and rotational position locators. In the discussion below, the position is given in relation to the construction of cosine-wave signal coil 110 and sine-wave signal coil 112 by providing the angular relations with respect to the sine operation of sine-wave signal coil 112 which results from the position of the leading edge of metallic target 124 and coils 110 and 112. The actual position of metallic target 124 in such a system can be derived from the angular position as measured by the output voltages of receive coils 104 and the topology of receive coils 110 and 112. Furthermore, as illustrated in FIG. 1B, the topology of coil 110 and the topology of coil 112 are coordinated to provide indication of the location of metallic target 124 relative to the receive coils 104.

Figure 2:
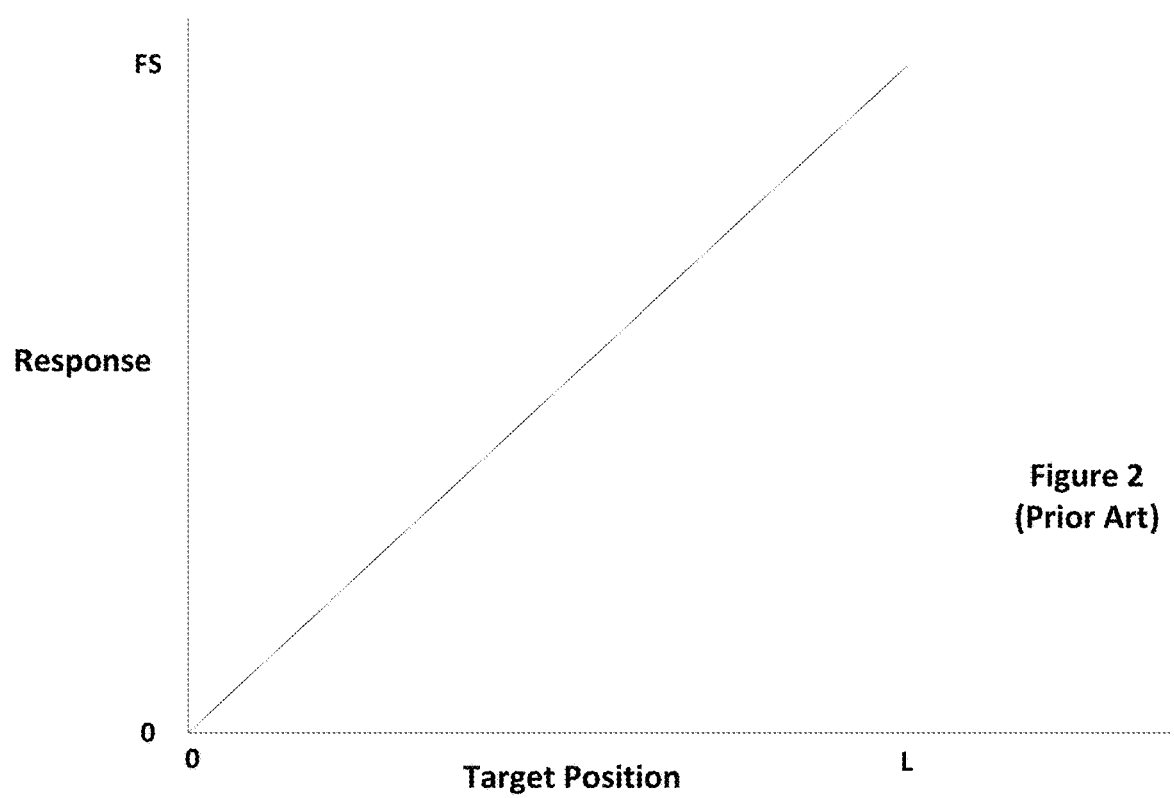
FIG. 2 illustrates a typical response vs. position output signal for the position sensor illustrated in FIG. 1B.

FIG. 2 illustrates a typical output response from receive sensor coils as illustrated in FIG. 1B. As illustrated in FIG. 2, as target 124 is traversed over the range of sensor coils 104, the response vs. position is linear. Consequently, the target position can be determined as a linear function of the response signals. In these systems, the response versus position curve as shown in FIG. 2 is linear with either a positive or negative slope. It is not possible to alter the slope or switch the slope from a positive slope to a negative slope with conventional sensor coils 104.

Figure 3:
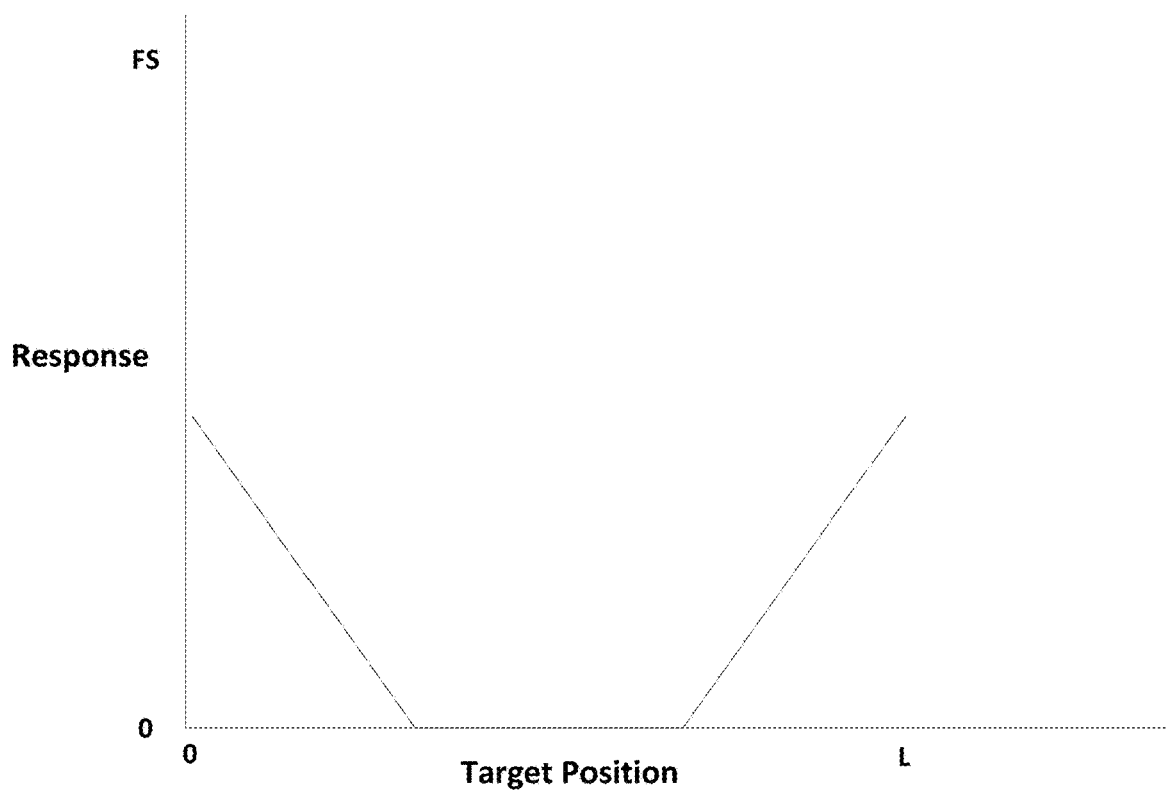
FIG. 3 illustrates a target response vs. position output signal for a position sensor.

However, in some application, it is highly desirable that the sensor output have both a positive and a negative slope along with a flat zone. An example of this response is illustrated in FIG. 3. In some cases, such a response can be fabricated with a microcomputer processing the linear response curve shown in FIG. 2. However, this approach has some significant disadvantages. In particular, such an approach significantly increases the cost, makes the position sensor slower in response, and increases the time to market. In particular, the position sensor made according to this method requires additional computing over that required to process the sine and cosine signals to arrive at a position determination.

In accordance with embodiments of the present invention, the structure of the sine and cosine sensor coils of the sensor coils is altered to provide a response curve, for example as illustrated in FIG. 3, without further processing. In particular, the coil polarity of the sine and cosine coils are changed at one or more points along the sensor coils. In that fashion, the slope of the output signal is inverted at those points by a physical alteration of the sensor coils. Furthermore, while the target is traversing the polarity change area, a flat response is produced.

Figure 4:
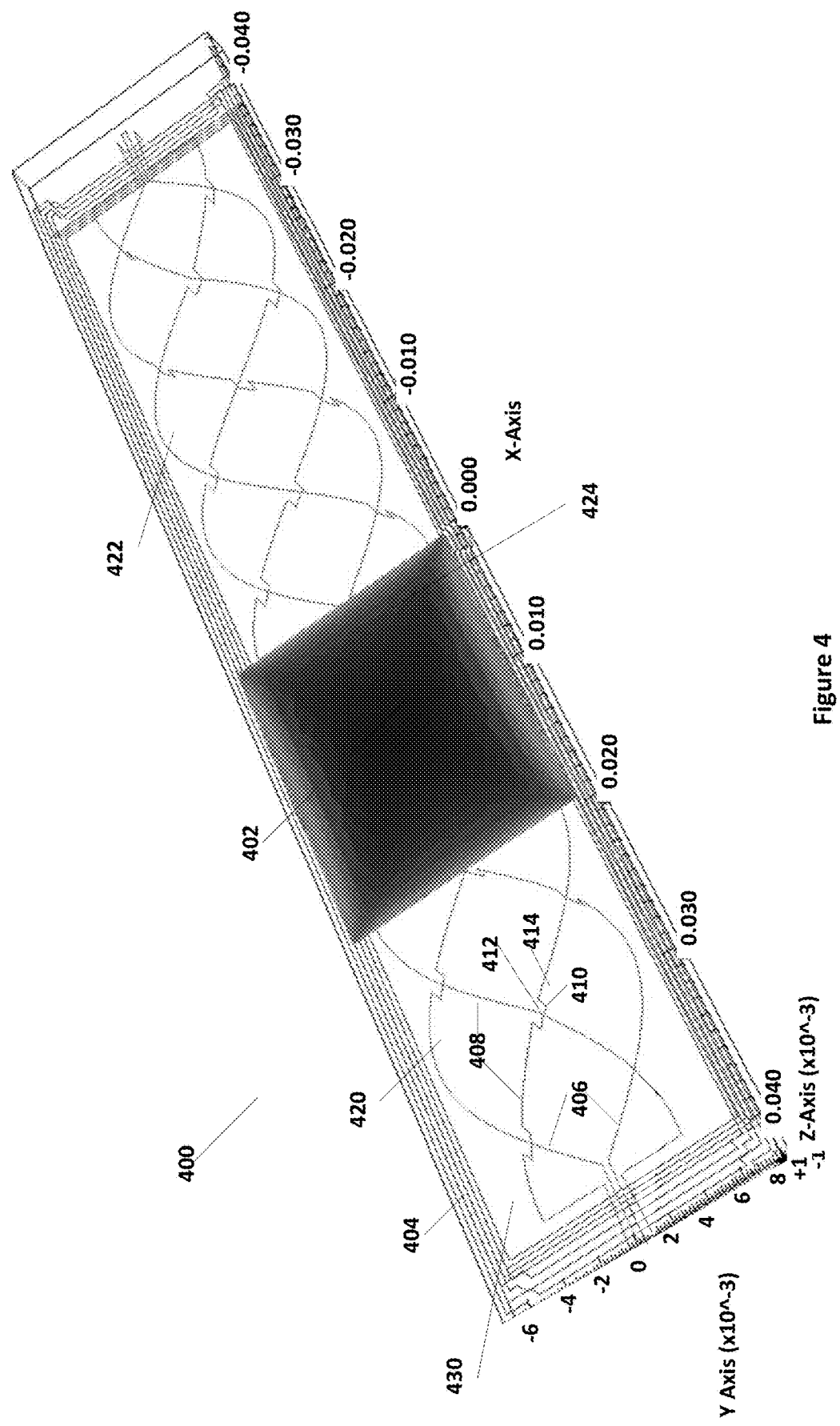
FIG. 4 illustrates a position sensor according to some embodiments of the present invention.

FIG. 4 illustrates a two-period linear position sensor 400 according to some embodiments of the present invention. As illustrated in FIG. 4, position sensor 400 includes transmitter coils 404 and receiver coils 430. A controller coupled to control the transmitter coils 404 and receiver signals from the receiver coils 430 is not explicitly shown, although one skilled in the art will recognize that functions as discussed below are the result of processing of signals from the receiver coils 430.

FIG. 4 illustrated sine coil 408 and cosine coil 406, each of which have two periods of extent along sensor 400. The two periods are labeled period 420 and period 422 in FIG. 4. Transmission coil 404 is positioned around sine coil 408 and cosine coil 406. FIG. 4 illustrates a three-dimensional view of position sensor 400. Consequently, sine coil 408 and cosine coil 406 are formed by traces along the top and along the bottom of a printed circuit board (PCB), which are connected by vias. As such, top traces 414 and bottom traces 412 are connected by vias 410. Sine coil 408 and cosine coil 406 in this example are arranged such that the coil polarity is changed between the first period and the second period. The coil polarity is changed by physically interconnecting traces of the sine coil 408 and the cosine coil 406 to reverse the current flow from that which would be normally attained in a conventional system.

The slope of the output signal, as discussed in more detail below, depends on whether target 402 is over first period 420 or over the second period 422. Furthermore, when target 402 is over the polarity change area 424, the output response is flat (excluding some noise generated from an offset that may be applied). Accordingly, as target 402 traverses across receiver coils 406 and 408, in first period 420 the output response will have a first slope and in second period 422 the output response will have a second slope, which is the negative of the first slope. When the target is over the polarity change 424, the output response will be flat.

Figure 5:
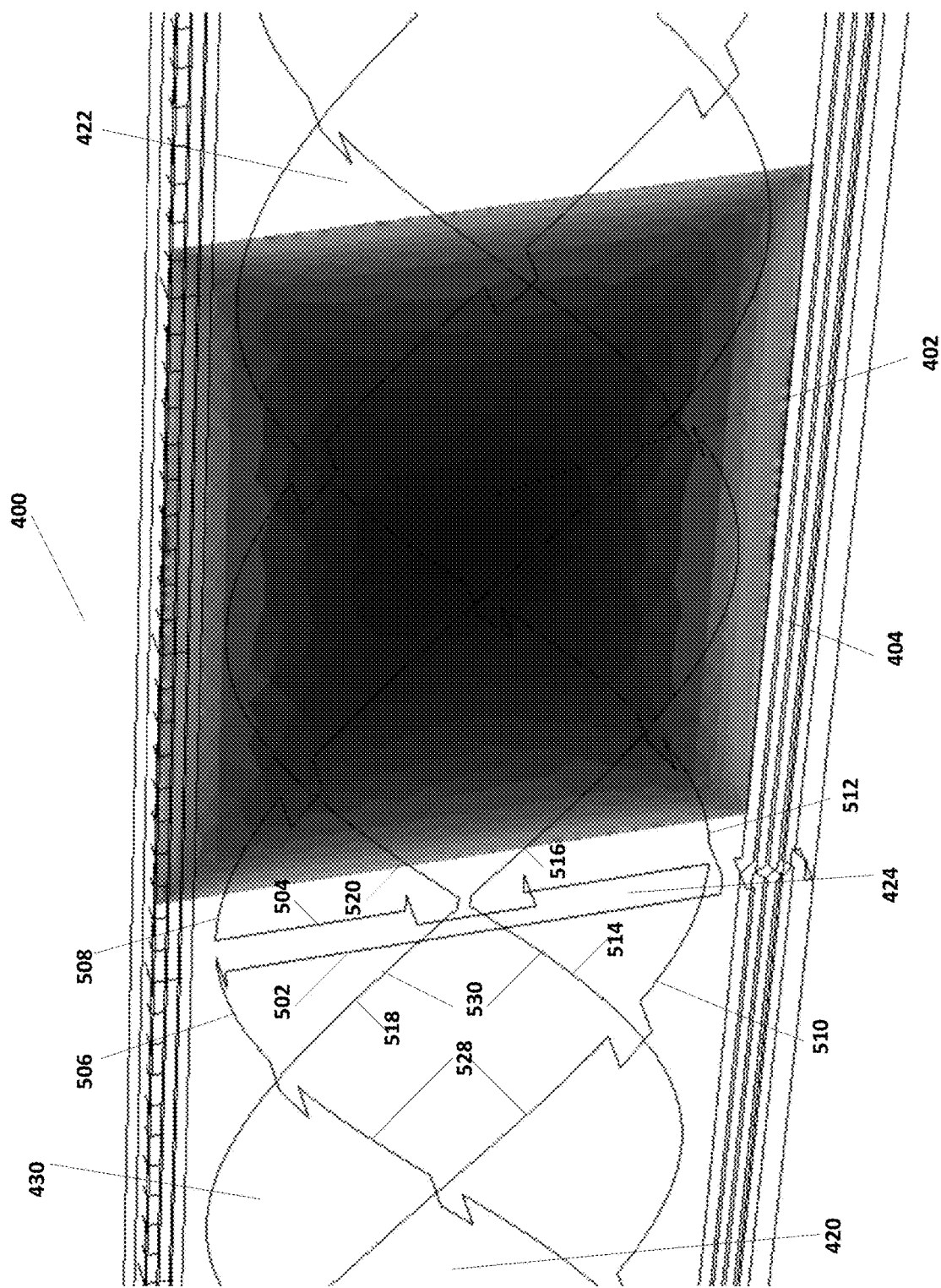
FIG. 5 illustrates a physical change of polarity in receive sensor coils of the position sensor illustrated in FIG. 4.

FIG. 5 illustrates implementation of a structural polarity change 424 in receiver coils 430. FIG. 5 illustrates upper traces 506 and 508 and lower traces 510 and 512 that are part of first receive coil 528. FIG. 5 further illustrates upper traces 518 and 520 and lower traces 514 and 516 that form part of second receive coil 530. In some embodiments, first receive coil 528 can be sine coil 408 and second receive coil 530 can be cosine coil 406. In some embodiments, depending on the location of polarity change 424 along receive coils 430, first receive coil 528 may be cosine coil 406 and second receive coil 530 may be sine coil 408 instead.

As illustrates, traces 506, 508, 510, 512, 514, 516, 518, and 520 can be formed on a top part and a bottom part of a PCB and can transition between the top part and bottom part of the PCB using vias through the PCB. Such arrangements allow the traces to be formed in the area of the structure polarity change 424 with the connections discussed below.

In a conventional structure, sine coil 408 and cosine coil 406 do not include a polarity shift. As a consequence, upper traces 506 and 508 of first coil 528 are directly connected and lower traces 510 and 512 of first coil 528 are directly connected to form first coil 528. Similarly, in the conventional structure, traces 518 and 516 of second coil 530 are connected and traces 514 and 520 of second coil 530 are connected to form second coil 530. However, FIG. 5 illustrates an embodiment of the present invention where trace 506 is coupled to trace 512 and trace 508 is coupled to trace 510. Similarly, in the embodiment illustrated in FIG. 5, trace 518 is coupled to trace 520 and trace 514 is coupled to trace 516, which provides a polarity shift in area 424.

As shown in FIG. 5, in some embodiments of the present invention a polarity shift is introduced in both first coil 528 and second coil 530. In particular, as shown in FIG. 5, in first coil 528 trace 506 is connected to trace 512 with a connector trace 502 and trace 510 is connected to trace 508 with a connecting trace 504. This causes a polarity shift in first coil 528. In second coil 530, the polarity shift is introduced as shown in FIG. 5 by connecting trace 514 and trace 516 and connecting trace 518 and trace 520.

Consequently, by introducing a polarity shift in polarity shift region 424 as shown in FIG. 5, the response slope provided by receive coils 430 switches slope as target 402 traverses polarity shift region 424. Furthermore, a flat response curve is attained while target 402 is over polarity shift region 424.

Figure 6:
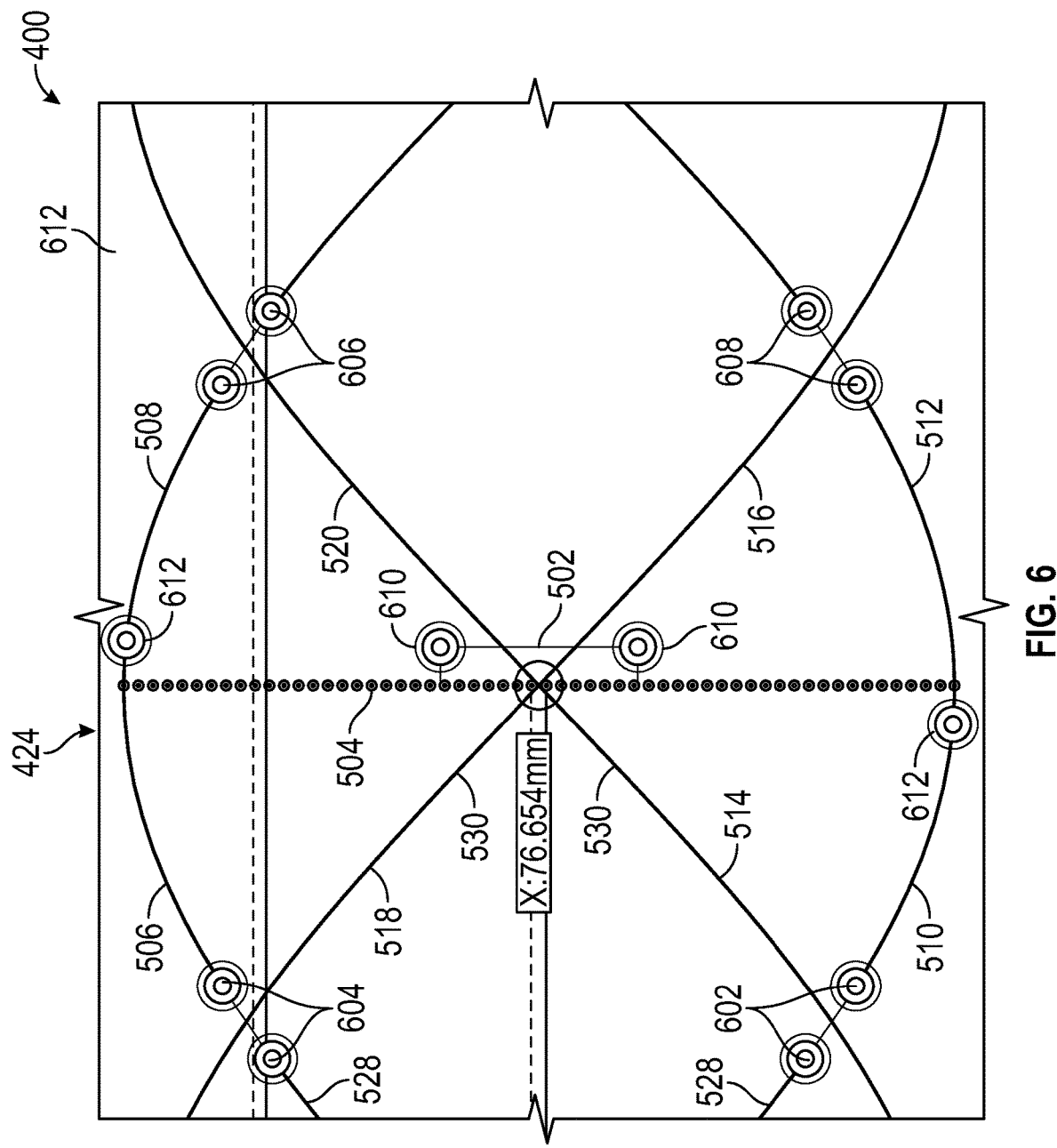
FIG. 6 provides another view of the physical change of polarity in receive sensor coils of the position sensor.

FIG. 6 illustrates a planar view of polarity shift region 424 of position sensor 400 as illustrated in FIGS. 4 and 5. The example illustrated in FIG. 6 illustrates how traces 506, 508, 510, 512, 514, and 516 are routed on each side of a printed circuit board 612 to construct the polarity shift in first coil 528 and second coil 530. In particular, vias 604 allows trace 506 to be shifted from bottom layer of PCB 612 to a top layer of PCB 612 so that trace 518 can cross trace 506 without connecting. Via 602 similarly allows for the crossing of traces 510 and 514. Vias 606 allows for the crossing of traces 508 and 520. Vias 608 allows for the crossing of traces 512 and 516. As illustrated in the example shown in FIG. 6, connecting trace 504 can be formed on the top side of PCB 612 and connected to traces 508 and 510 through vias 612. Connecting trace 502 can be formed mostly on the bottom side of PCB 612 and brought to the top side of PCB 612 through vias 610 to cross traces 520 and 516. One skilled in the art will recognize that there are other configurations for constructing the polarity shifts in polarity shift region 424.

FIGS. 5 and 6 illustrate an example where polarity change region 424 is positioned between first period 420 and second period 422 of a two-period position sensor 400. In that case, first receive coil 530 corresponds with cosine coil 406 and second receive coil 528 corresponds to sine coil 408. However, in some embodiments a polarity change can occur elsewhere over the receive coils 430. For example, if the polarity change is shifted then first coil 530 may correspond with sine coil 408 and second coil 528 corresponds with cosine coil 406.

FIGS. 4, 5, and 6 illustrate an embodiment with a linear position sensor having sensor coils with two periods and where the polarity shift is constructed between the first period and the second period. One of ordinary skill will understand that the position sensor can be formed with receive sensors with any number of periods and where the polarity shift can be constructed at other locations along the receive coils or in multiple locations along the position sensor, as discussed above. Such structures can be formed to provide response curves having various shapes other than that illustrated in FIG. 3.

Figure 7A:
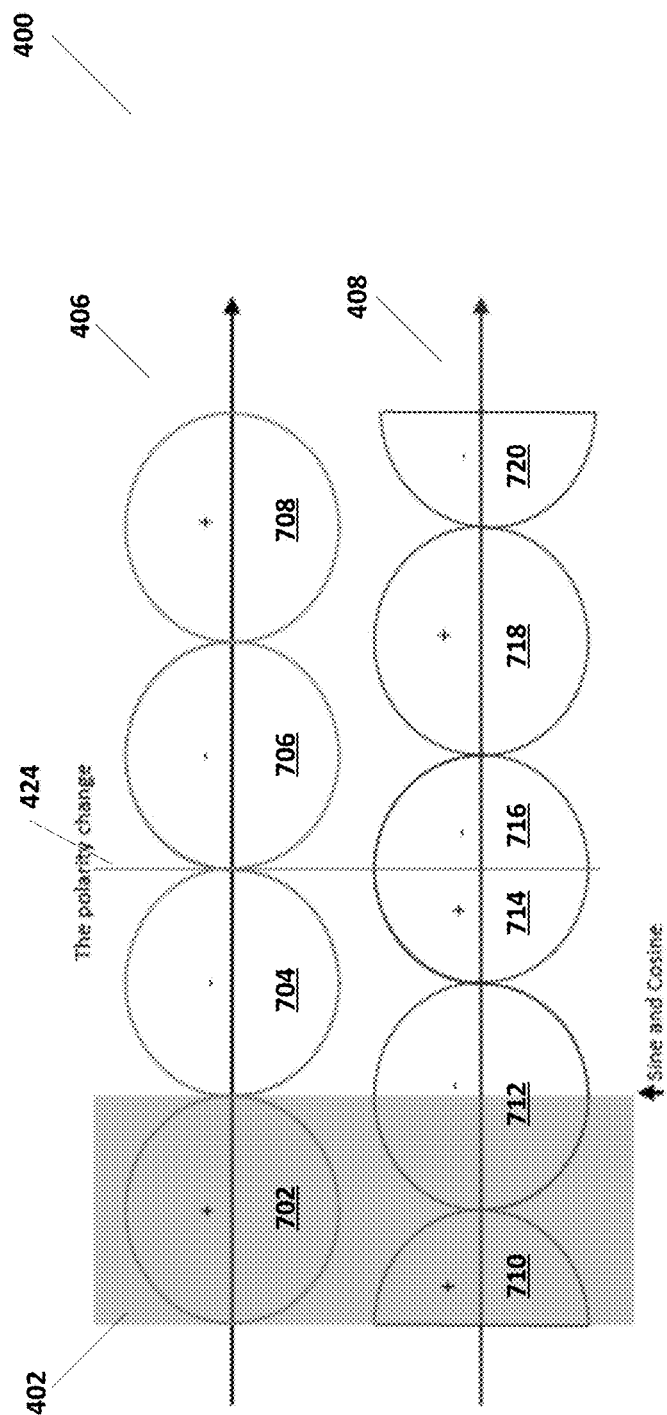
FIGS. 7A and 7B demonstrate operation of receive sensor coils according to some embodiments.
Figure 7B:
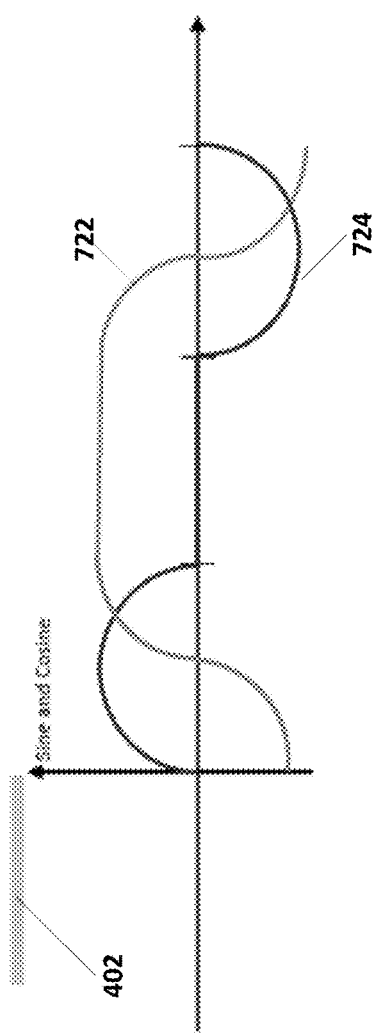

FIGS. 7A and 7B illustrates operation of position sensor 400 according to some embodiments. FIG. 7A illustrates polarity of the current loops in sensor coils 406 and 408. Polarity designations are relative to one another and, except for indicating current loops of opposite polarity, the designation of a positive (+) polarity and a negative (−) polarity is arbitrary and for convenience of explanation only. Furthermore, in the interest of clarity, sensor coils 406 and 408 are illustrated separately instead of being overlapped as they would be in a position sensor. FIGS. 7A and 7B further illustrates a two-period position sensor where the phase change occurs between the first period and the second period, as was illustrated in FIGS. 4-6.

The polarity reflects a circular direction of current in a section of the sensor coil. For example, as shown in FIG. 5, cosine coil 406 includes traces 518 and 514, which come together to form a roughly circular structure where the current flow at any given time is in a particular direction (clockwise or counterclockwise). In conventional receive coils, adjacent loops of the sensor coil have current flowing in opposite directions—creating a particular polarity relationship in that section. In conventional sensor coils, the polarity changes in each adjacent loop of the coil structure. However, in accordance with embodiments of the present invention, the polarity is switched from the conventional progression in at least one point along the sensor coils so that two adjacent loops have the same polarity or one loop is split to provide different polarities in each half-loop.

In accordance with embodiments of the present invention, FIG. 7A illustrates cosine coil 406 having a first loop 702 with a positive polarity and an adjacent loop 704 having a negative polarity. At polarity change 424, there is a hardwired polarity change and loop 706, which is adjacent to loop 704, also has a negative polarity. Loop 708, which is adjacent to loop 706, then has a positive polarity. As target 402 is moved across coil 406, the cosine response 722 is illustrated in FIG. 7B.

Similarly, sine coil 408 illustrated in FIG. 7A illustrates a positive polarity half-loop 710 adjacent to a negative polarity loop 712 of sine coil 408. Polarity change 424 occurs in the adjacent loop, which as illustrated in FIG. 7A exhibits half-loop 714 with a positive polarity and half-loop 716 with negative polarity. The adjacent loop 718 (adjacent to half-loop 716) is positive polarity and the last loop 720 of sine coil 408 is negative polarity. As target 402 is moved across coil 408, the sine response 724 and the cosine response 722 is illustrated in FIG. 7B. The polarity changes in coils 406 and 408 are hardwired into the traces of these coils. Further, although FIG. 7A demonstrates cosine coils 406 and 408 where the polarity change occurs at a point where the traces that form coil 406 are at their closest positioning while the traces that form coil 408 are at their widest spacing, the polarity change can be formed at other points along position sensor 400.

Figure 8A:
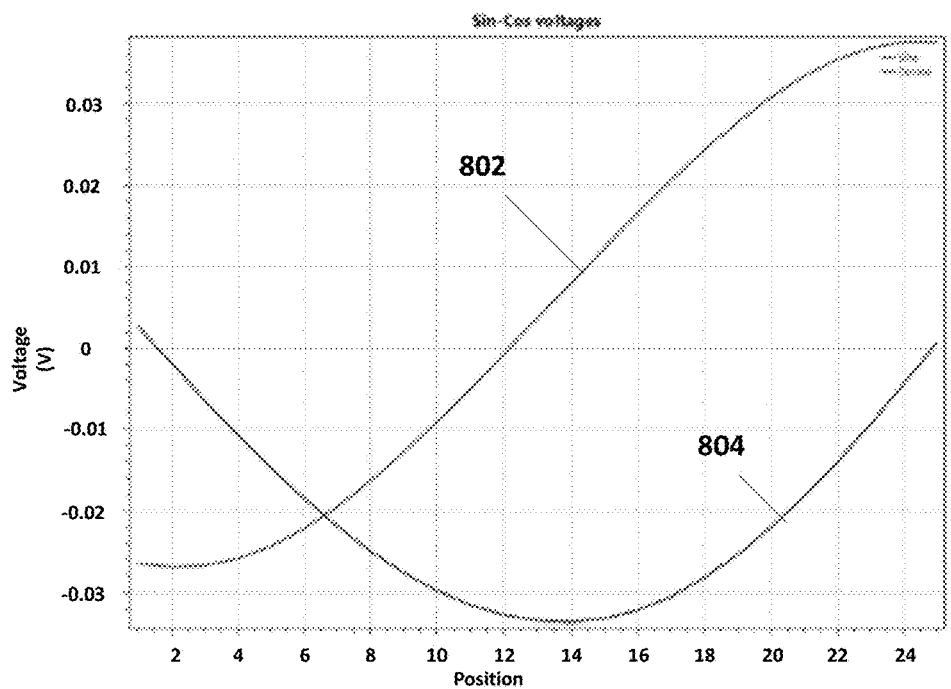
FIGS. 8A and 8B illustrates sine and cosine voltages as a function of target position in a first half period and through a flat region of the receiver sensor coils in the position sensor, respectively.
Figure 8B:
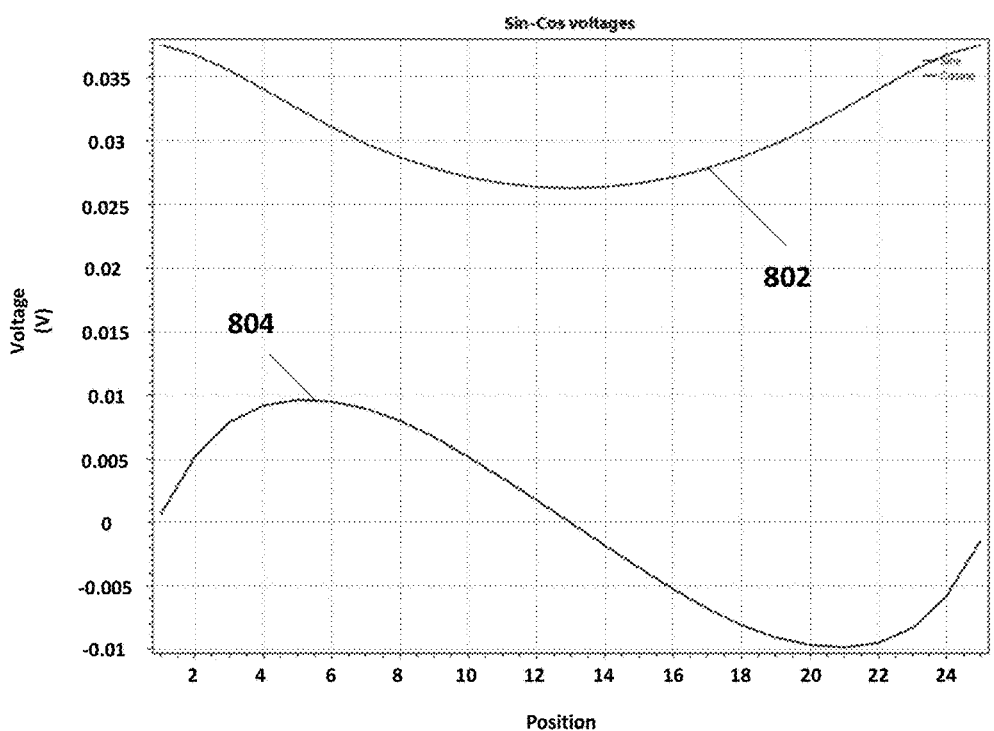
Figure 9A:
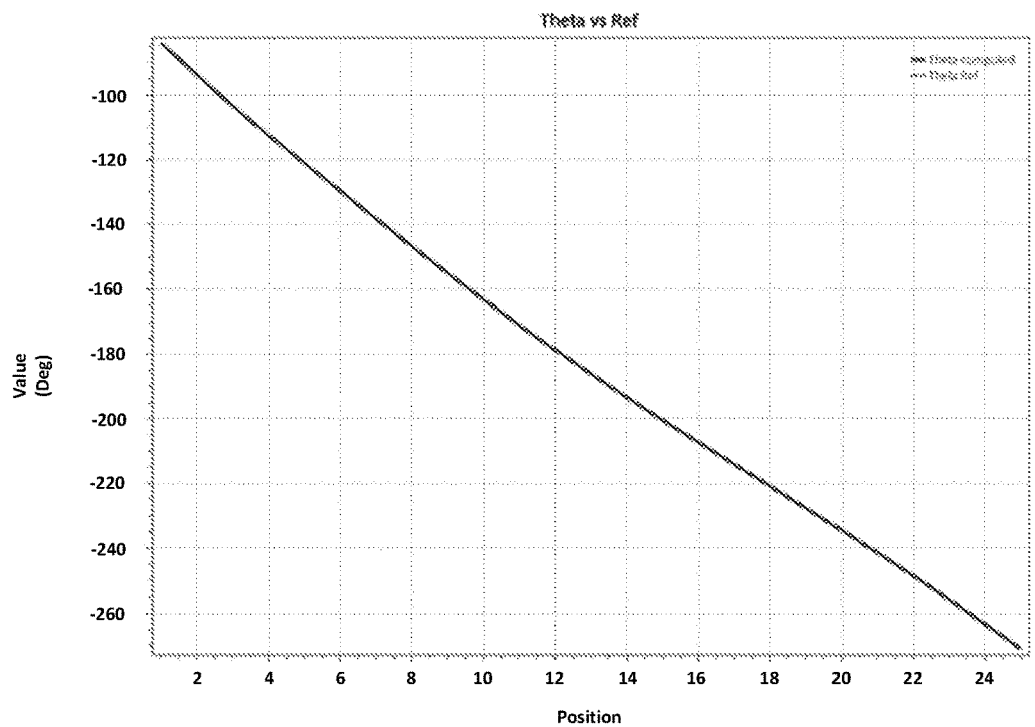
FIGS. 9A and 9B illustrates results output versus position in the first half period of the first period of the receiver sensor coils in the position sensor and through a first half of the second period of the receiver sensor coils, respectively.
Figure 9B:
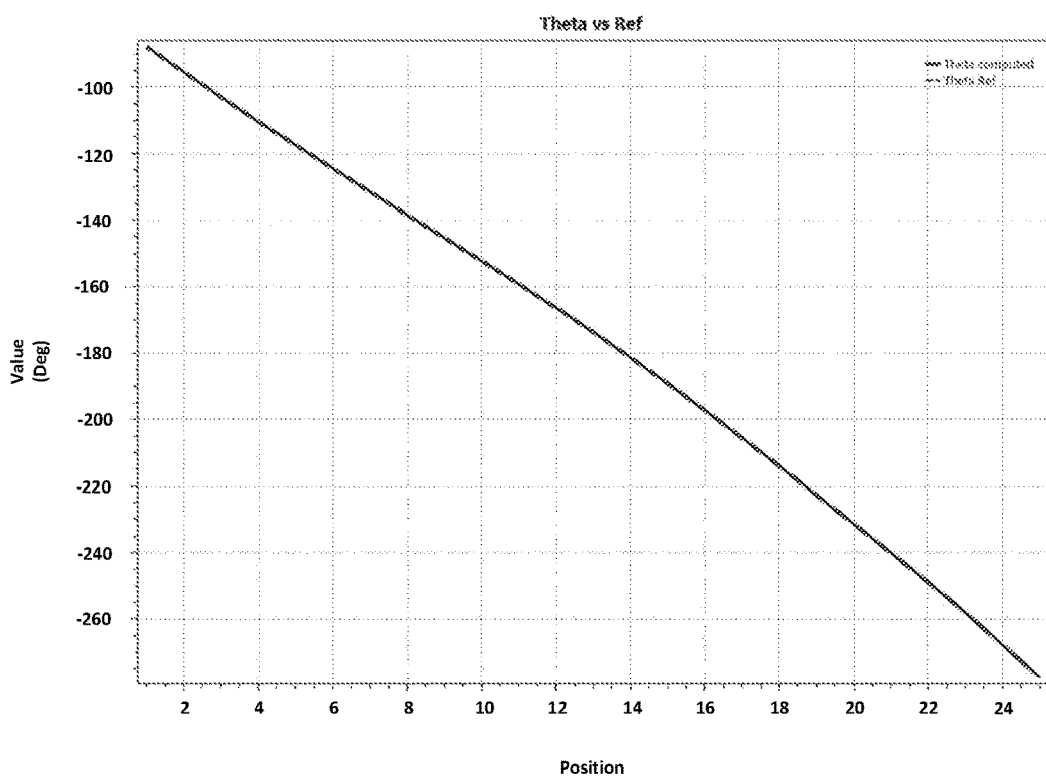

FIG. 8A illustrates a simulation of a sine response 804 and a cosine response 802 in a first half-period of linear position sensor 400 as has been illustrated in FIGS. 4 through 6. FIG. 8B illustrates a sine response 804 and a cosine response 802 through the polarity change 424 illustrated in FIGS. 4-7A. The results illustrated the simulation tool before any linearization has been made. The Y-values are in voltages. However, the X-axis represents a moving window indicative of position. FIG. 9A illustrated the simulated target position versus reference values during the first half period based on the sine response 804 and cosine response 802 simulated from FIG. 8A. The response illustrated in FIG. 9A is determined from the sine response 804 and the cosine response 802, as is known. A similar response can be determined for the second half-period of linear position sensor 400 except that the slope will be opposite that shown in FIG. 9A. FIG. 9B illustrates the response in the first half of the second period. As shown in both FIGS. 9A and 9B, both the value as computed and the value referenced are illustrated but are identical.

FIGS. 4-6 illustrate a linear position sensor 400 having a phase change 424 in each of a cosine coil 406 and a sine coil 408. Although the particular example illustrated shows that phase change 424 occurs in both cosine coil 406 and sine coil 408 between first period 420 and second period 422 of the two-period position sensor 400, in some embodiments a phase change can be constructed at any position along reference coils 430. Further, there may be more than one phase change along reference coils 430. Furthermore, in some embodiments, phase changes may be positioned in only one of cosine coil 406 or sine coil 408 at each phase change location along reference coils 430. Various response curves can result by positioning phase changes in individual ones of cosine coil 406 and sine coil 408 along position sensor 400.

FIGS. 4 through 9 illustrate an embodiment of linear position sensor 400 according to some embodiments. The principles outlined here can be also incorporated in a rotational position sensor. Consequently, in accordance with some embodiments a rotation positional sensor is disclosed that includes polarity changes in the receive coils in FIGS. 10 and 11B discussed below.

Figure 10:
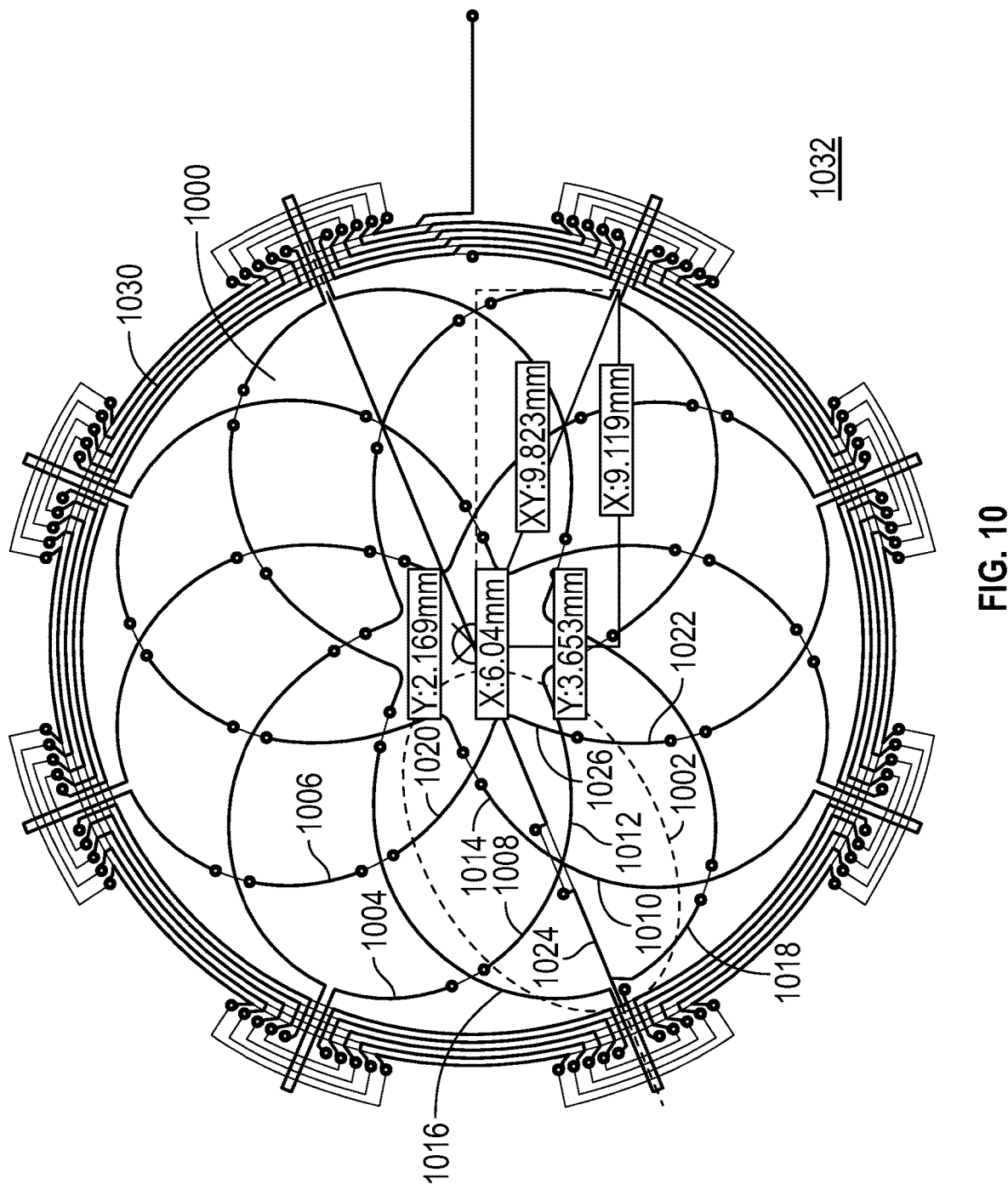
FIG. 10 illustrates a rotary position sensor according to some embodiments of the present invention.

FIG. 10 illustrates an example of a rotational positional sensor receiver coils 1000 according to some embodiments. Transmitter coils 1030 are also illustrated. As shown in FIG. 10, the receiver coils 1000 includes a first coil 1006 and a second coil 1004 arranged in circular plane to operate as a rotational position sensor. Transmitter coils 1030 and receiver coils 1000 are formed on the top side and bottom side of a printed circuit board 1032. Further, receiver coils 1000 illustrates a polarity change area 1002 in coils 1004 and 1006 where coils 1004 and 1006 are both arranged to produce polarity changes. As shown in FIG. 10, phase change 1002 occurs where the traces of coil 1004 are at their narrowest while traces of coil 1006 are at their widest. In some embodiments, phase change 1002 can occur where traces of coil 1004 are at their widest while traces of coil 1006 are at their narrowest. A controller (not shown) is configured to drive transmitter coils 1030 and receive signals from first coil 1006 and second coil 1004 in order to provide a positional response as a target (not shown) is rotated over receiver coils 1000.

As illustrated in FIG. 10, second coil 1004 includes traces 1008, 1010, 1012, and 1014 in polarity change area 1002. In a conventional sensor array, trace 1008 would be connected to traces 1012 and trace 1010 would be connected to trace 1014. In the embodiment of sensor coils 1000 illustrated in FIG. 10, trace 1008 is connected to trace 1010 and trace 1014 is connected to trace 1012, which provides a polarity shift in second coil 1004.

Furthermore, first coil 1006 includes traces 1016, 1018, 1020, and 1022. In a conventional sensor array, traces 1018 and 1016 would be connected and traces 1020 and 1022 would be connected. Sensor coils 1000 according to some embodiments as shown in FIG. 10, however, provide for a polarity change by connected trace 1016 with trace 1022 via connecting trace 1026 and connects trace 1018 with trace 1020 via connecting trace 1024. Notice that connecting traces 1024 and 1026 overlap with trace 1024 mostly formed on the top side of circuit board 1032 and trace 1026 formed on the bottom side of circuit board 1032.

Consequently, in receiver coil 1000 according to some embodiments, a polarity change in both first coil 1006 and second coil 1004 is provided by physical connection of the traces as described above. As a target (not shown) passes over the polarity change, the output response provides for a flat region and a positive and a negative slope as a function of angle, similar to that described above with FIG. 7 in a linear position array according to some embodiments.

Figure 11A:
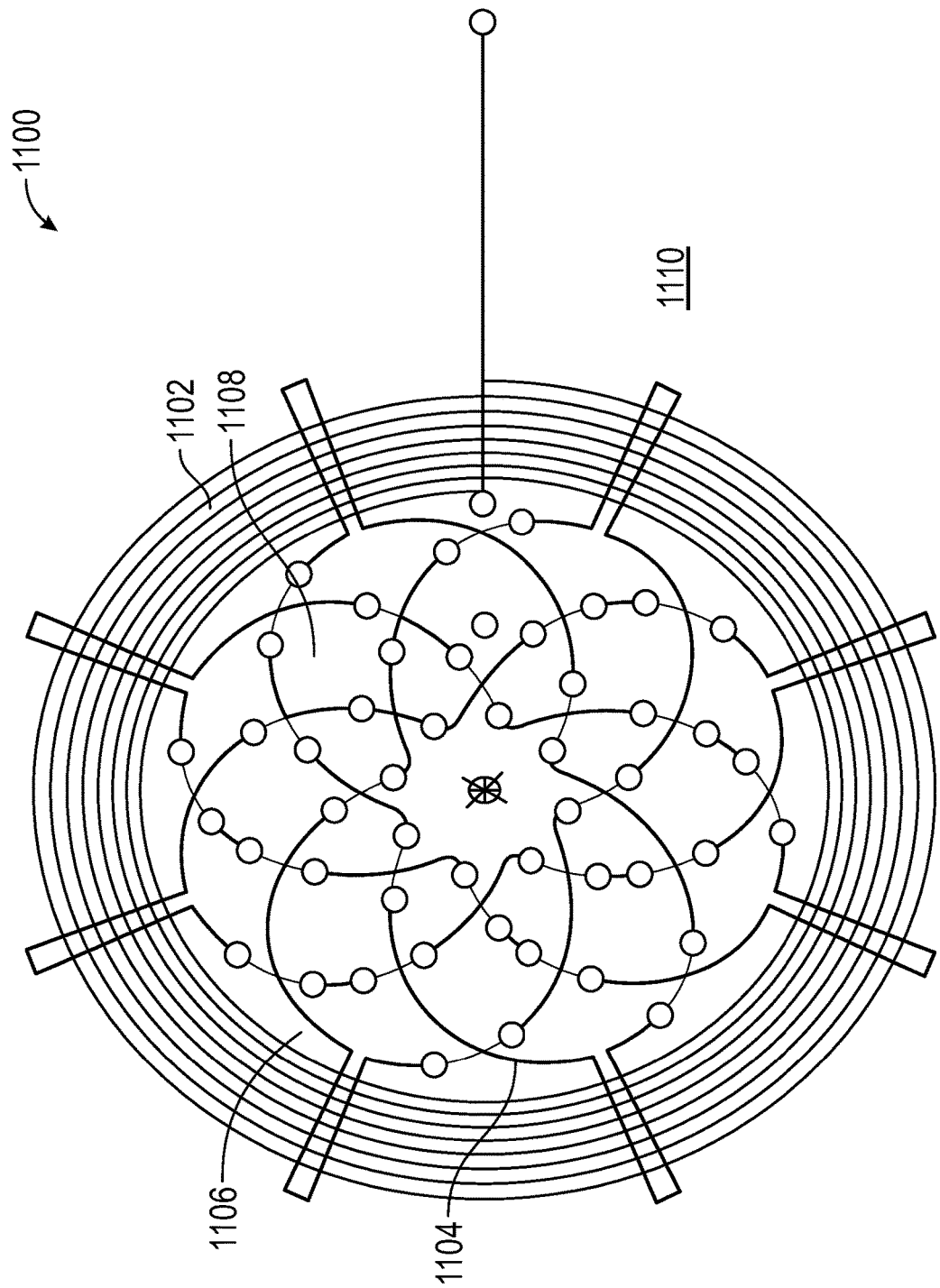
FIGS. 11A and 11B illustrates another embodiment of a rotary position sensor according to some embodiments.

FIG. 11A illustrates a rotational position sensor 1100 formed on a printed circuit board (PCB) 1110. As illustrated, rotational position sensor 1100 includes transmitter coils 1102 and sensor coils 1108 positioned on PCB 1110. As is further illustrated, sensor coils 1108 includes first coils 1104 and second coils 1106. Rotational position sensor 1100 does not exhibit a polarity shift in either of coils 1104 and 1106. Consequently, the rotational position sensor illustrated in FIG. 11A will provide a conventional position response, e.g. linear position sensor with angular position of a target positioned over the receive coils 1108.

Figure 11B:
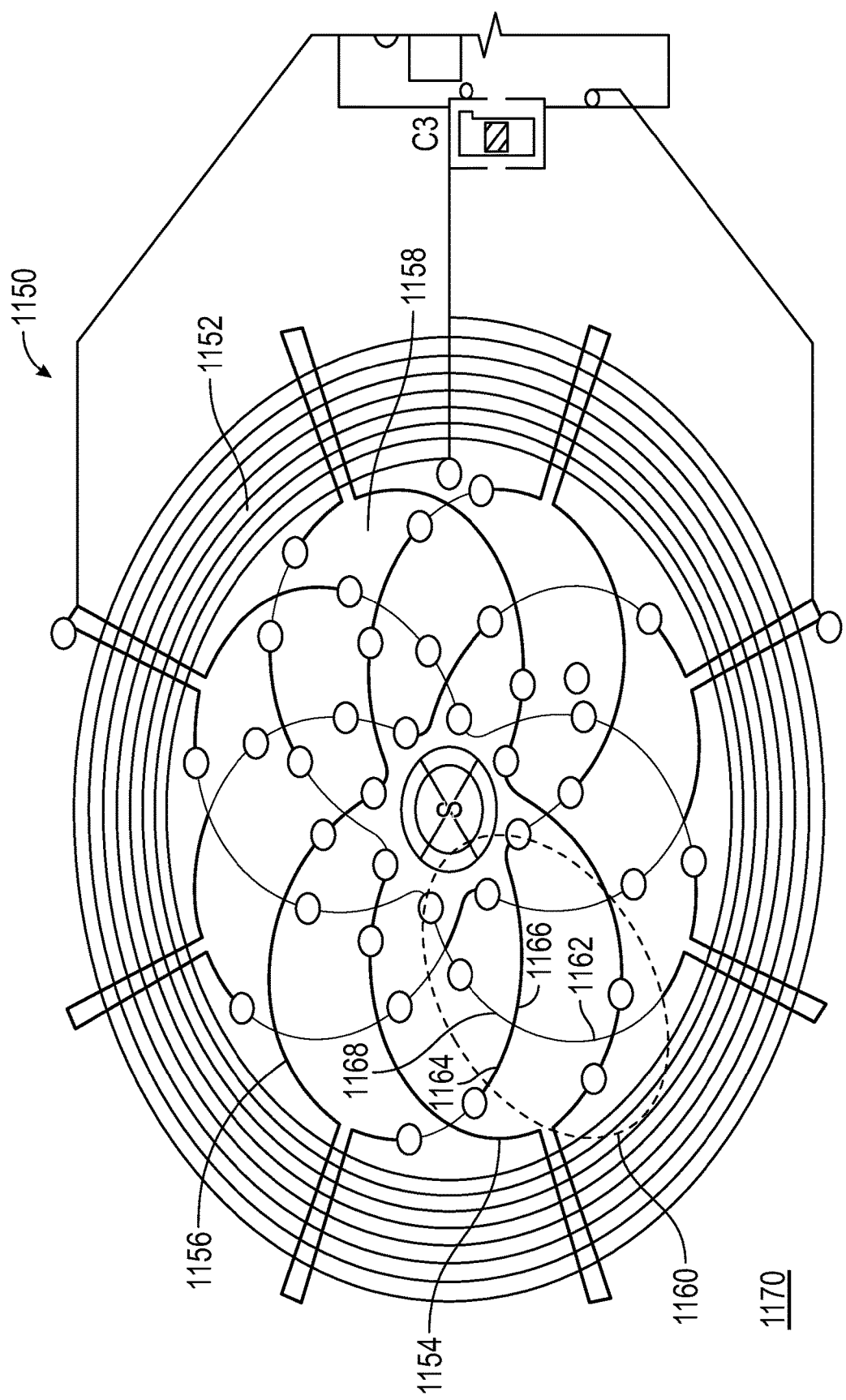

In comparison, FIG. 11B illustrates a position sensor 1150 according to some embodiments of the present invention. Position sensor 1150 includes transmission coils 1152, and sensor coils 1158 that includes first coils 1154, and second coils 1156 formed on a PCB 1170. In the embodiment illustrated in FIG. 11B, second coils 1156 include a polarity change in area 1160. However, first coils 1154 do not include a polarity change. As shown in FIG. 11B, second coils 1156 includes traces 1162, 1164, 1166, and 1168 where trace 1162 is connected to trace 1164 while trace 1166 is connected to trace 1168, which creates the polarity change. In some embodiments, the polarity change can be included in first coils 1154 rather than second coils 1156. Or, as illustrated in FIG. 10, the polarity change is provided in both the first coil and the second coil.

FIG. 11B illustrates a phase change that occurs when traces of second coils 1156 are at their closest separation. In some embodiments, the phase change may occur when traces of second coils 1156 are at their widest separation, in which case the traces are connected with connector traces as discussed above.

Figure 12A:
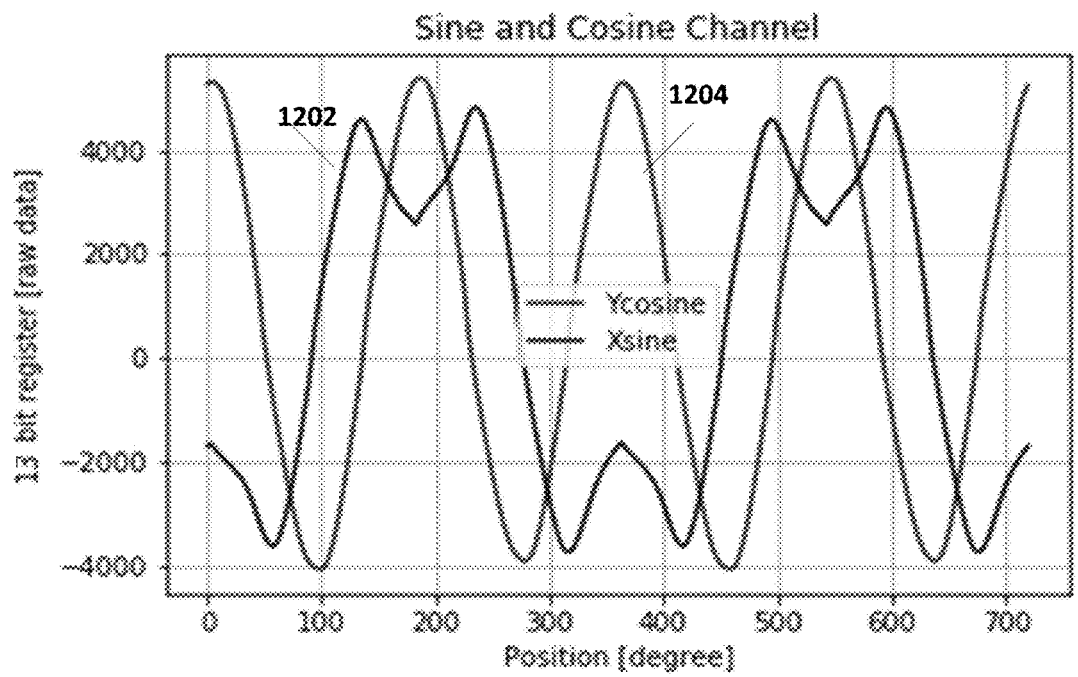
FIGS. 12A, 12B, and 12C illustrate data and results derived from a rotational position sensor according to some embodiments.
Figure 12B:
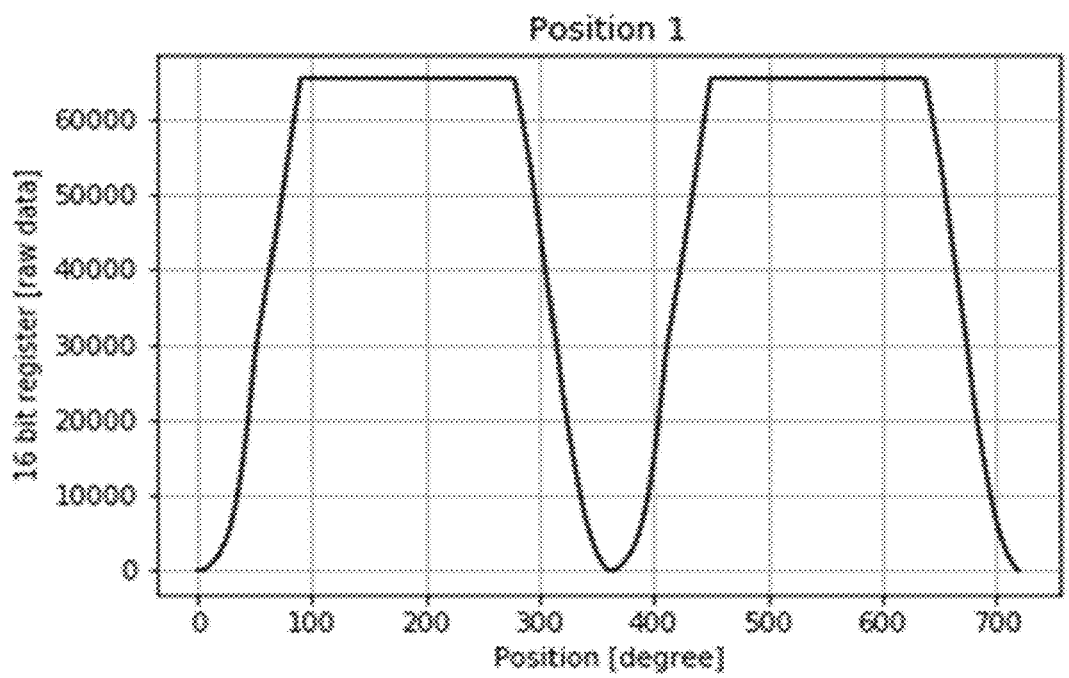

FIG. 12A illustrates a sine response 1202 and a cosine response 1204 as a function of angular position for an example of position sensor 1150 where the phase change occurs in the sine coils, labeled as second coils 1156. There is no similar phase change in the cosine coils. Consequently, sine response 1202 exhibits a phase change every 180 degrees. FIG. 12B illustrates the resulting response as a function of angular position.

Figure 12C:
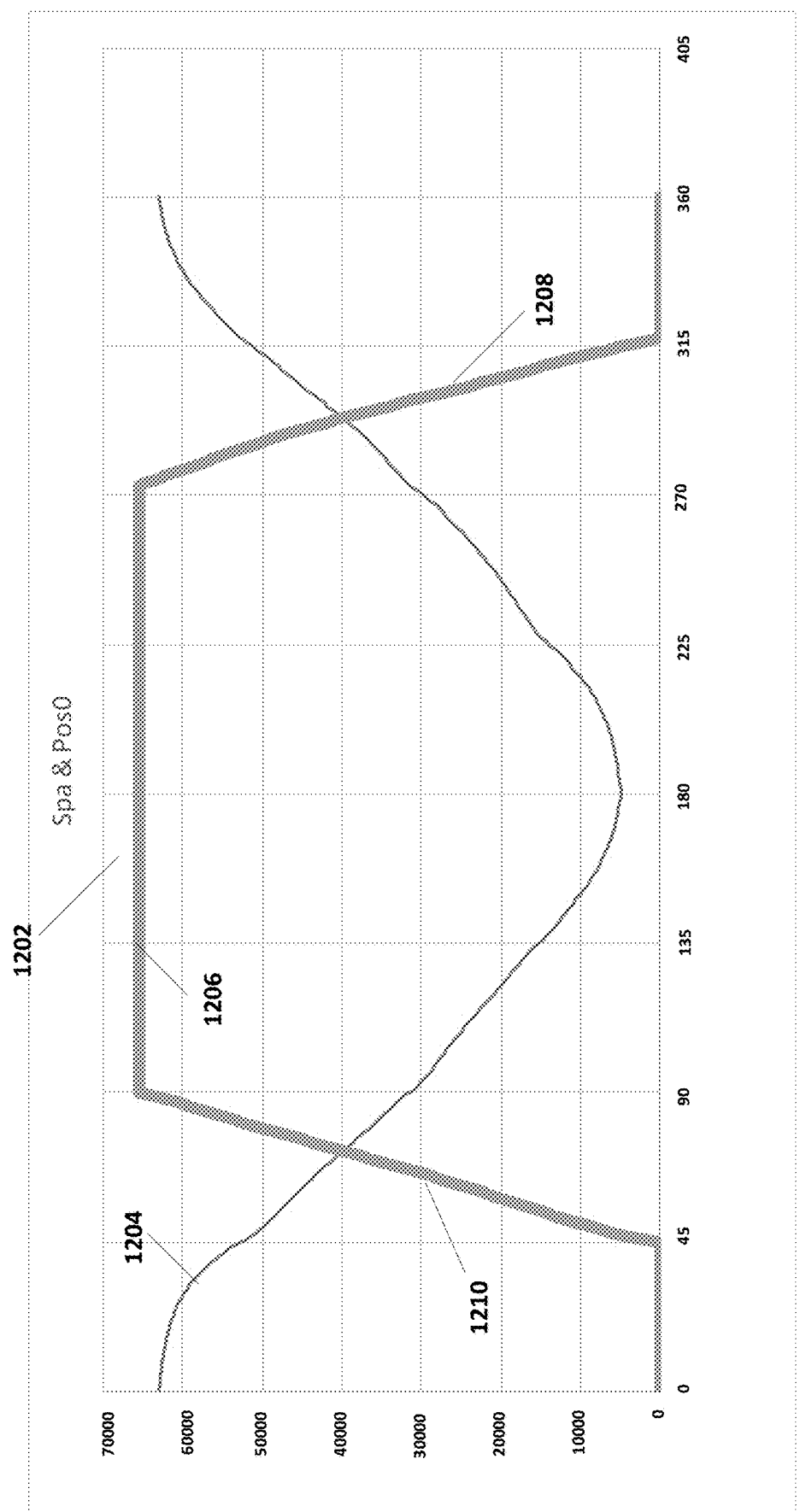

FIG. 12C illustrates the response as a function of position for an example rotary sensor according to some embodiments. FIG. 12C illustrates the positional response 1202, which shows calculated response versus target position as a function of rotational angle in a rotational position sensor such as that illustrated in FIG. 10. The Spa signal 1204 illustrated in FIG. 12C is the spatial angle defined as the arcoth (sine/cosine) of the position. The SPA signal 1204 is typically prior to calibration and linearization and comes directly from the coils. As is illustrated in FIG. 12C the positional response as a function of angle includes a response at a first slope 1210, a flat portion 1206 as the target traverses the area where there is a polarity shift, and a response at a second slope 1208, which is opposite slope of the first slope 1210.

Figure 13:
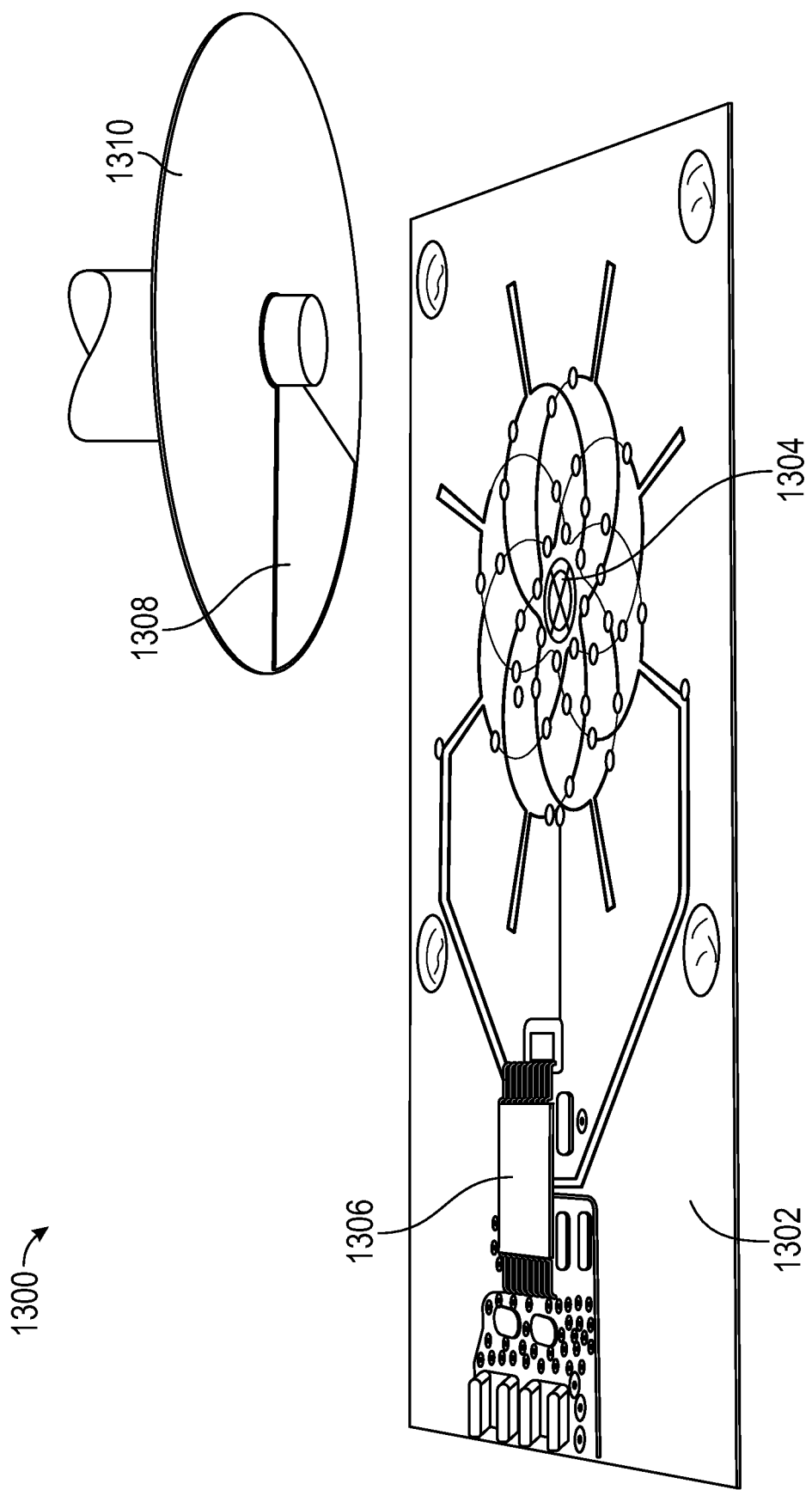
FIG. 13 is a photo of a rotary position sensor according to some embodiments.

FIG. 13 illustrates a photographic view of a rotary position sensor 1300 according to some embodiments of the present invention. Rotary position sensor 1300 may be a position sensor as illustrated, for example, in FIG. 10 or FIG. 11B. A transmitter coil and receive coils are formed in coils 1304 on a printed circuit board (PCB) 1302. As discussed above, usually the receive coils includes a first coil and a second coil, often labeled a sine coil and a cosine coil. In accordance with embodiments of the present invention, one or both of the receive coils includes a polarity change. The polarity change is physically wired into the coil. As a result of the polarity change, the output response as a function of angle has periods of a first slope, a flat region, and a second slope. In most cases, the second slope is a negative slope of the first slope. FIG. 13 further illustrates a target 1308 mounted on a rotation axis 1310. Axis 1310 is mounted on PCB 1302 such that target 1308 rotates over coils 1304.

Control circuitry 1306 may also be mounted on printed circuit board 1302. Control circuitry 1306 powers transmission coils and receives signals from the receive coils. Control circuitry 1306 may also be configured to produce the output response indicating the position of target 1308 with respect to the receive coils of coils 1304.

The above detailed description is provided to illustrate specific embodiments of the present invention and is not intended to be limiting. Numerous variations and modifications within the scope of the present invention are possible. The present invention is set forth in the following claims.

What is claimed is:

1. A position sensor, comprising:
   a transmission coil;
   receive coils, the receive coils including at least one polarity change;
   a target configured to transit across the receive coils; and
   a controller configured to drive the transmission coil, receive signals from the receive coils, and provide a position response indicative of the target position over the receive coils,
   wherein the position response exhibits a first linear region of a first slope and a second linear region of a second slope.

2. The position sensor of claim 1, wherein the transmission coil and the receive coils form a linear position sensor.

3. The position sensor of claim 2, wherein the receive coils include a first coil and a second coil.

4. The position sensor of claim 3, wherein a polarity change of the at least one polarity change is constructed in the first coil at a position where traces of the first coil have a narrowest separation.

5. The position sensor of claim 3, wherein a polarity change of the at least one polarity change is constructed in the first coil at a position where traces of the first coil have a widest separation.

6. The position sensor of claim 1, wherein the receive coils define a two-period linear position sensor having a first receive coil and a second coil and wherein the at least one polarity change includes a first polarity change in the first receive coil and a second polarity change in the second coil.

7. The position sensor of claim 6, wherein the first polarity change and the second polarity change occur at a location in the receive coils where traces of the first receive coil are at their widest separation and traces of the second receive coil are at their narrowest separation.

8. The position sensor of claim 7, wherein the location separates a first period of the two-period linear position and a second period of the two-period linear position.

9. The position sensor of claim 1, wherein the transmission coil and the receive coils define a rotational position sensor.

10. The position sensor of claim 9, wherein the receive coils include a first receive coil and a second receive coil and wherein the at least one polarity change includes a first polarity change in the first receive coil and a second polarity change in the second receive coil.

11. The position sensor of claim 10, wherein the first polarity change occurs when traces of the first receive coil are at their widest separation and the second polarity change occurs when traces of the second receive coil are in their narrowest separation.

12. The position sensor of claim 9, wherein the receive coils include a first receive coil and a second receive coil and wherein the at least one polarity change includes a polarity change in the first receive coil.

13. The position sensor of claim 12, wherein the polarity change occurs where traces of the first receive coil are at their widest separation.

14. The position sensor of claim 12, wherein the polarity change occurs where traces of the first receive coil are at their narrowest separation.

15. A position sensor, comprising:
    receive coils that include a first coil and a second coil formed on a printed circuit board (PCB) in a geometry, wherein at least one of the first coil and the second coil is configured to include at least one phase change; and
    transmit coils formed on the PCB around the receive coils, wherein a position response as a target transits the receive coils includes a plurality of linear regions of differing slopes.

16. The position sensor of claim 15, wherein the first coil is a sine coil and the second coil is a cosine coil.

17. The position sensor of claim 15, wherein the geometry is linear.

18. The position sensor of claim 15, wherein the geometry is rotary.

19. The position sensor of claim 15, wherein each of the first coil and the second coil includes a phase change of the at least one phase change.

20. The position sensor of claim 19, wherein the phase change in the first coil occurs where traces of the first coil are at their widest separation and the phase change in the second coil occurs where traces of the second coil are at their narrowest separation.

\* \* \* \* \*